US010866190B2

(12) United States Patent
Caldwell et al.

(10) Patent No.: US 10,866,190 B2
(45) Date of Patent: Dec. 15, 2020

(54) THREE-DIMENSIONAL COHERENT PLASMONIC NANOWIRE ARRAYS FOR ENHANCEMENT OF OPTICAL PROCESSES

(71) Applicant: The Government of the United States of America, as represented by the Secretary of the Navy, Arlington, VA (US)

(72) Inventors: Joshua D. Caldwell, Nashville, TN (US); Orest J. Glembocki, Alexandria, VA (US); Sharka M. Prokes, Columbia, MD (US); Ronald W. Rendell, Washington, DC (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/200,992

(22) Filed: Nov. 27, 2018

(65) Prior Publication Data

US 2019/0162669 A1  May 30, 2019

Related U.S. Application Data

(62) Division of application No. 13/456,316, filed on Apr. 26, 2012, now abandoned.

(60) Provisional application No. 61/478,987, filed on Apr. 26, 2011.

(51) Int. Cl.
*G01N 21/65* (2006.01)

(52) U.S. Cl.
CPC .................. *G01N 21/658* (2013.01)

(58) Field of Classification Search
CPC .................................................. G01N 21/658
USPC ........................................... 250/216; 438/479
See application file for complete search history.

(56) References Cited

U.S. PATENT DOCUMENTS

| 7,622,703 B2* | 11/2009 | De Rossi | H01L 31/0236 250/214.1 |
| 7,713,849 B2* | 5/2010 | Habib | G01N 21/658 438/479 |
| 7,773,228 B1* | 8/2010 | Hollingsworth | A61B 5/0478 356/445 |

(Continued)

FOREIGN PATENT DOCUMENTS

WO    WO-2010063116 A1 *  6/2010  ......... G01N 21/7743

*Primary Examiner* — Seung C Sohn
(74) *Attorney, Agent, or Firm* — US Naval Research Laboratory; Rebecca L. Forman

(57) ABSTRACT

A plasmonic grating sensor having periodic arrays of vertically aligned plasmonic nanopillars, nanowires, or both with an interparticle pitch ranging from $\lambda/8$-$2\lambda$, where $\lambda$ is the incident wavelength of light divided by the effective index of refraction of the sample; a coupled-plasmonic array sensor having vertically aligned periodic arrays of plasmonically coupled nanopillars, nanowires, or both with interparticle gaps sufficient to induce overlap between the plasmonic evanescent fields from neighboring nanoparticles, typically requiring edge-to-edge separations of less than 20 nm; and a plasmo-photonic array sensor having a double-resonant, periodic array of vertically aligned subarrays of 1 to 25 plasmonically coupled nanopillars, nanowires, or both where the subarrays are periodically spaced at a pitch on the order of a wavelength of light.

3 Claims, 12 Drawing Sheets

(56) References Cited

U.S. PATENT DOCUMENTS

| | | | |
|---|---|---|---|
| 8,780,439 B2* | 7/2014 | Bora | B82Y 20/00 |
| | | | 359/342 |
| 2011/0045230 A1* | 2/2011 | Habib | G01N 21/658 |
| | | | 428/85 |

* cited by examiner

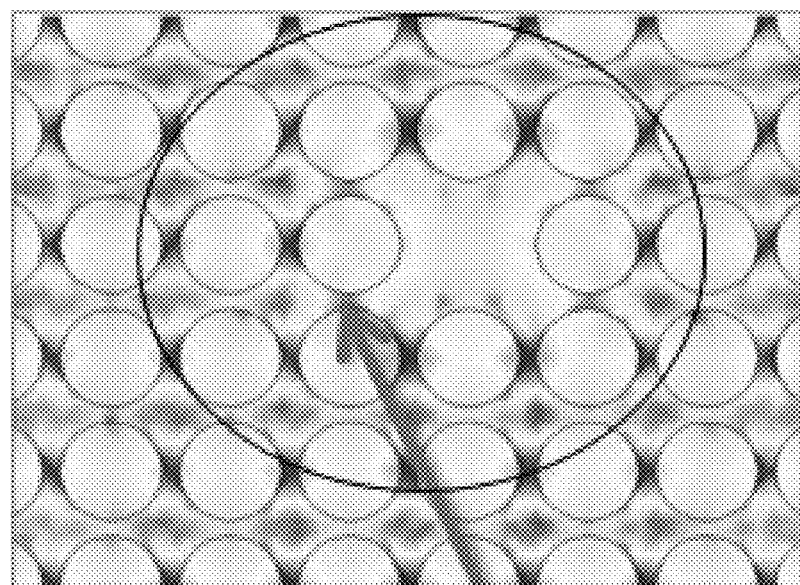
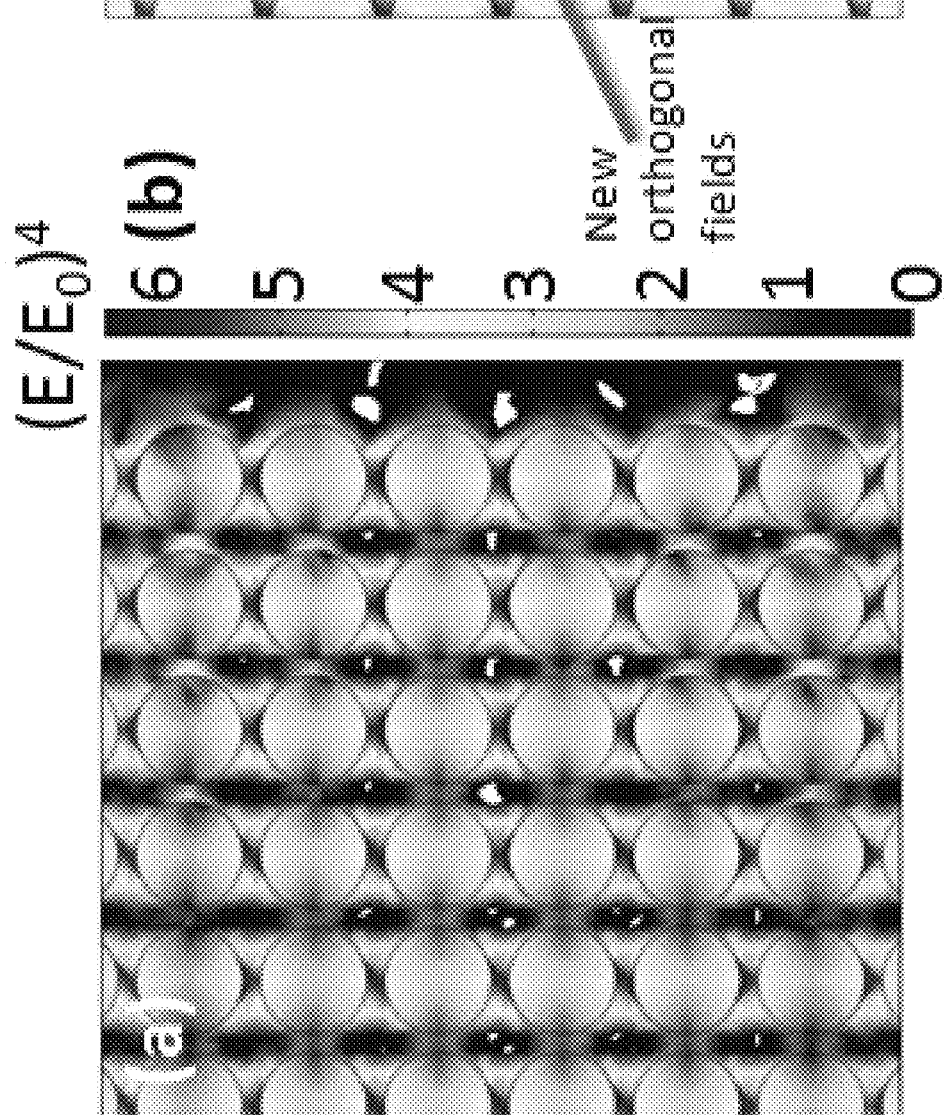
FIG. 7B
FIG. 7A

THREE-DIMENSIONAL COHERENT PLASMONIC NANOWIRE ARRAYS FOR ENHANCEMENT OF OPTICAL PROCESSES

CROSS-REFERENCE TO RELATED APPLICATIONS

This Application is a divisional application of U.S. application Ser. No. 13/456,316 filed on Apr. 26, 2012 by Joshua D. Caldwell et al. entitled "THREE-DIMENSIONAL COHERENT PLASMONIC NANOWIRE ARRAYS FOR ENHANCEMENT OF OPTICAL PROCESSES, which claimed the benefit of U.S. Provisional Application 61/478, 987 filed on Apr. 26, 2011 by Joshua D. Caldwell et al. entitled "THREE-DIMENSIONAL COHERENT PLASMONIC NANOWIRE ARRAYS FOR ENHANCEMENT OF OPTICAL PROCESSES," the entire contents of each are incorporated herein by reference.

BACKGROUND OF THE INVENTION

Field of the Invention

The present invention relates generally to enhancing optical processes and more specifically to plasmonic nanowire arrays for enhancement of optical processes.

Description of the Prior Art

Optical processes such as Raman scattering and fluorescence are very useful in identifying materials of interest from their optical or vibrational signatures. However, for trace levels (ppm or lower) of chemical species these processes are typically too weak to detect without some method of enhancing the optical process (signal level). In addition, the light scattered via the Raman process or fluoresence emission is incoherent, thus the light is scattered or emitted into a broad, diffuse hemisphere. This further adds to reduced efficiency in the collection aspect of any probing system.

The problem of optically detecting the presence of trace levels of materials can be addressed by using nanotextured plasmonic materials, most commonly metals such Ag, Au, Cu or Al, to name a few, which develop surface plasmon resonances where optical stimulation (incident light) at the resonant frequency (wavelength) can stimulate surface plasmons. Surface plasmons are resonant oscillations of conduction electrons within a metal or semiconductor that once excited induce very large local electric fields that in turn increase the scattering intensity at the surface, enhance the optical absorption of materials and/or sensors and photovoltaics and provide increases in the efficiency and intensity of optical emitters. One such benefit of these various enhancements is the surface enhanced Raman scattering (SERS) effect, where enhancements as high as $10^6$ from the individual nanoparticles and as high as $10^{14}$ from clusters of two or more nanoparticles have been reported. In addition, fluorescence processes are also enhanced (SEFS) by as much as $10^4$.

Previous work in SERS and SEFS-based sensors for the detection of trace amounts of chemicals, biochemical compounds, explosive or chemical and biological warfare agents have predominantly used collections of randomly arranged, isolated plasmonic nanoparticles such as colloids or nanowires, aggregations of such nanoparticles and/or patterned arrangements of sets of closely-spaced nanoparticles (<20 nm gap), where interparticle plasmonic coupling may be induced, with each set being separated from its neighbor by relatively large distances. In this latter case, large local plasmonic fields result, which within small (~5-10 nm) regions have extremely high SERS/SEFS enhancement factors. While such approaches are ideal for near-field measurements such as NSOM or single molecule detection via SERS or SEFS, this also leads to very low uniformity and reproducibility on a large-area substrate. It is such large area substrates that are most likely to be needed if SERS/SEFS based sensors are to attain a market in homeland security, bio-/medical and/or defense applications.

The current state of the art in surface-plasmon resonant structures and SERS or SEFS substrates is focused on the fabrication of uniform distributions of nanoparticles such a nanospheres or the fabrication of metal-coated openings in the substrate that are produced by Mesophotonics Inc. These substrates are designed to maximize the SERS and/or SEFS intensity, but do not attempt to benefit from plasmonic coupling between closely-spaced nanostructures, long-range plasmonic coupling from large arrays of such nanostructures or from patterning these structures into a 1D or 2D diffraction gratings, whereby providing directionality and reduced divergence for the emitted and/or scattered irradiation.

BRIEF SUMMARY OF THE INVENTION

The aforementioned problems are overcome in the present invention which provides a plasmonic grating sensor having vertically aligned periodic arrays of plasmonic nanopillars, nanowires, or both with an interparticle pitch from 200 to 2000 nm; a near-field coupled-plasmonic array sensor having vertically aligned periodic arrays of plasmonically coupled nanopillars, nanowires, or both with interparticle gaps small enough to induce overlapping evanescent plasmonic fields between neighboring particles (typically with edge-to-edge separations of <20 nm) within a large area, multiple particle architecture; and a plasmo-photonic array sensor having a double-resonance, periodic array of plasmonic nanoparticles distributed in subarrays of 1 to 25 plasmonically coupled nanopillars, nanowires, or other nanoparticles such as colloids where the subarrays are periodically spaced at a pitch on the order of a wavelength of light ($\lambda/8$<pitch<$3\lambda$; $\lambda$=incident wavelength).

These and other features and advantages of the invention, as well as the invention itself, will become better understood by reference to the following detailed description, appended claims, and accompanying drawings.

BRIEF DESCRIPTION OF THE DRAWINGS

FIGS. 7A and 7B show a top view of the spatial distributions of the calculated SERS enhancement within an array of 100 nm solid silver nanowires with an interwire gap of 8 nm of a perfect periodic array (FIG. 7A) and a periodic array with one nanowire missing (FIG. 7B).

DETAILED DESCRIPTION OF THE INVENTION

The present invention pertains to three arrayed plasmonic architectures that solve the need for a large area sensor with high signal uniformity and reproducibility, while maintaining high average SERS enhancement factors. The first structure is the plasmonic-grating sensor, which comprises periodic arrays of plasmonic nanoparticles with the interparticle pitch being on the order of a wavelength of light within the medium ($\lambda/n_{eff}$; $n_{eff}$ is the effective index of refraction for the material chosen) in the UV-Vis-NIR region of the electromagnetic spectrum (200-2000 nm). The second structure is the coupled-plasmonic array sensor, which comprises periodic arrays of plasmonically coupled nanopillars/nanowires with interparticle gaps small enough to enable overlap between the evanescent fields from neighboring plasmonic nanoparticles, which typically requires edge-to-edge separations between the nanoparticles of less than 20 nm. The third structure is the plasmo-photonic array sensor, which is a double-resonant, periodic array of nanoparticles where small subarrays (1-25 nanowires) of coupled plasmonic nanoparticles that are periodically spaced at a pitch on the order of a wavelength of light. This last concept is designed to both induce plasmonic coupling between the closely spaced nanoparticles in a subarray, which in turn are spaced at fractions of the wavelength of light to create a two-dimensional grating. This double resonant structure enables the user to benefit from the large field enhancements (i.e. large Raman or fluorescence signal response) due to the coupled plasmonic subarrays, while focusing and directing the scattered or emitted radiation at a preferred angle with respect to the substrate surface. This latter benefit removes the divergence of the optical signal, enabling the response to be collected more efficiently at a distance. In the limit of an isolated pillar as the subarray unit, this structure is the same as 1). A schematic of the three sensor varieties discussed here are presented in FIGS. 1A-1C. These sensors can be used as SERS- or SEFS-based sensors or in more exotic optical devices, such as enhanced optical collectors/photodetectors, enhanced emitters, wavelength upconversion species, improved efficiency photovoltaics, or magnetoplasmonic devices (where a magnetic medium is present) to name a few.

Figure 2B:
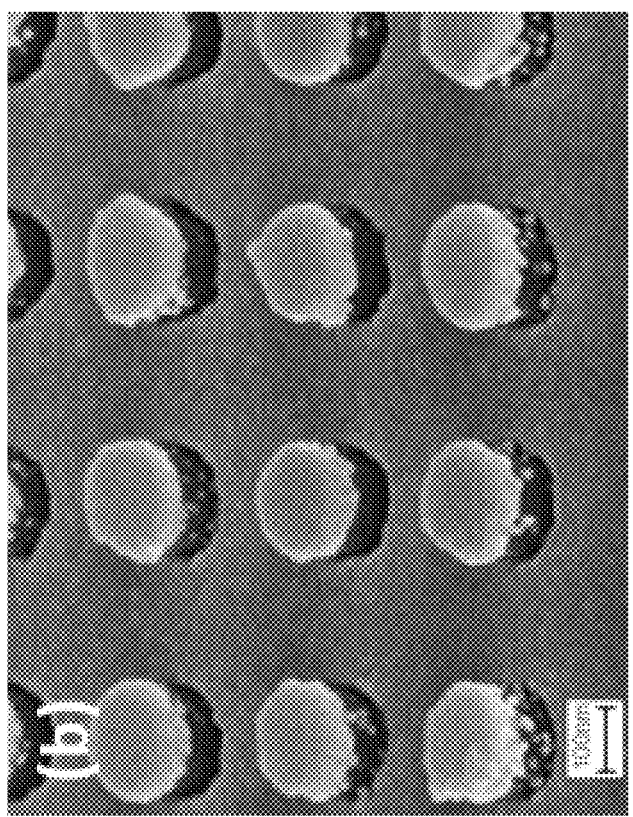
FIGS. 2A and 2B are SEM images of 170 nm tall Si nanopillars prior to (FIG. 2A) and following (FIG. 2B) Ag deposition via electron beam evaporation of a silver source.
Figure 2A:
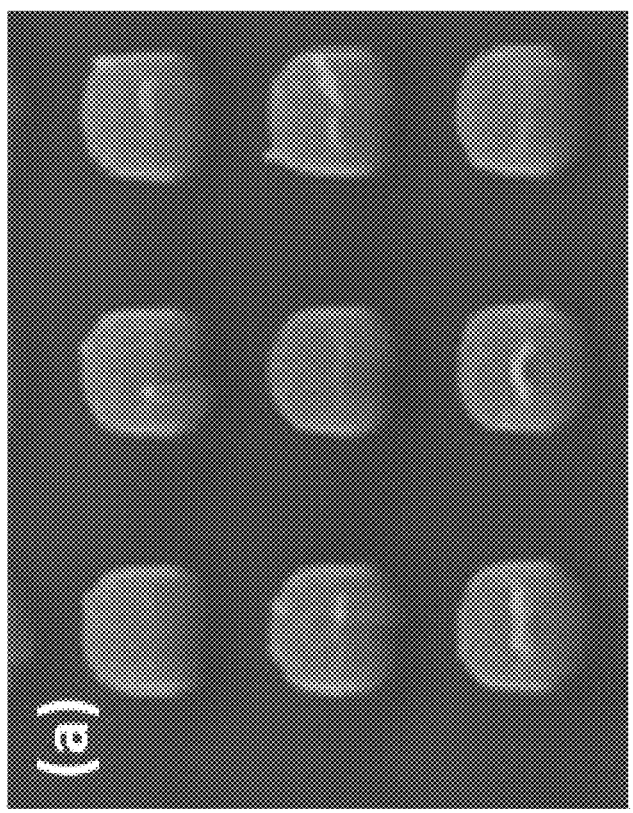
Figures 3A, 3B:
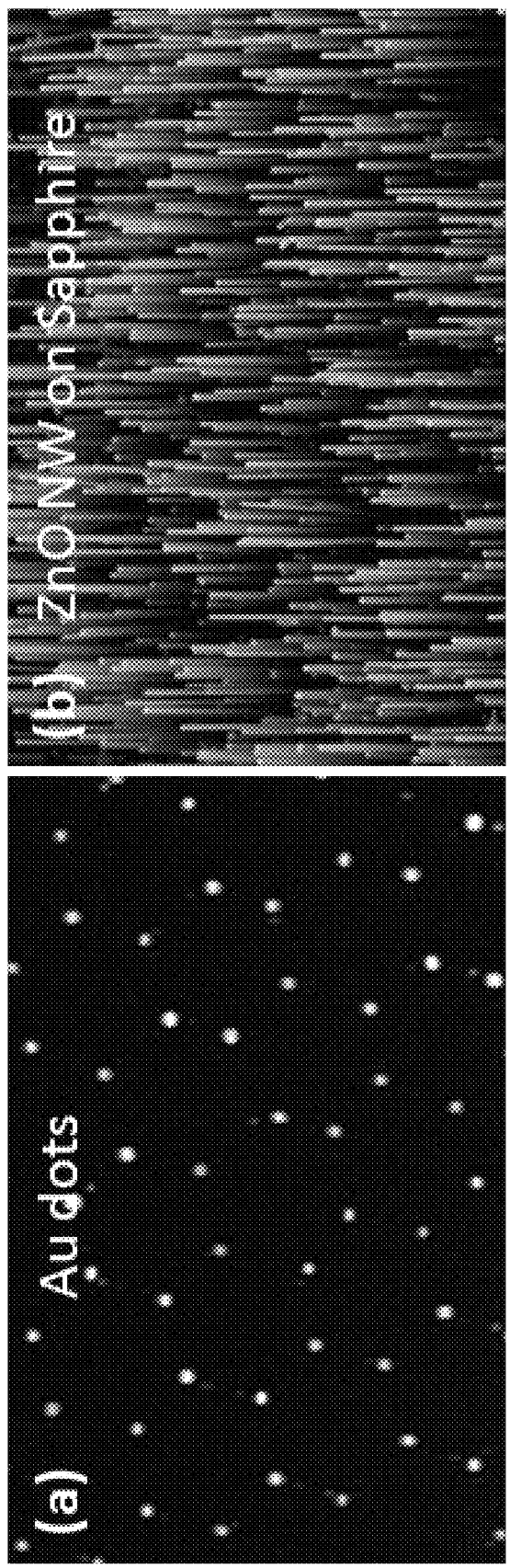
FIGS. 3A and 3B are SEM images of Au dots deposited via nanosphere lithography (FIG. 3A) and ZnO nanowires grown via VLS using the Au dot pattern shown in FIG. 3A as a catalyst (FIG. 3B).

An important component of all of these structures is the periodic array of vertically aligned nanopillars/nanowires. These can be constructed of either solid metal (Ag, Au, Al, Cu, etc.) or core-shell nanostructures, where a semiconductor or dielectric nanowire or nanopillar is overcoated with a thin metal film. The metal in both cases is any metal that exhibits plasmonic effects under optical illumination. For the purpose of the present invention, nanowires are considered semiconductor, dielectric or metal rods that are fabricated via growth methods (vapor-liquid-solid, chemical vapor deposition, electrodeposition, etc.), while nanopillars consist of rods that are formed via etching processes (reactive ion etching, chemically-enhanced etching, photochemical etching, wet-chemical etching, etc.). In the context of the metal coating of the core-shell structures, various coating morphologies and conformalities can be attained by modifying the deposition process, these include, but are not limited to electron beam evaporation or RF sputtering of a metal source, chemical vapor deposition or atomic layer deposition, or electro or electroless deposition. Presented in FIGS. 2A and 2B are SEM images of Si nanopillars fabricated through a mix of electron beam lithography and reactive ion etching into a square periodic pattern prior to metal deposition (FIG. 2A), and after metal deposition via electron beam evaporation of Ag (FIG. 2B). Presented in FIGS. 3A and 3B are SEM images of gold dots arranged in a hexagonal periodic pattern attained through nanosphere lithography on a sapphire substrate (FIG. 3A) and of vertical ZnO nanowires grown via the VLS process using the periodic pattern of gold dots as the growth catalyst to define the position and diameter of the nanowires (FIG. 3B). These two approaches represent two methods of the many that are included under this effort for fabricating periodic arrays of vertical nanopillars and nanowires, with other combinations of these approaches also being valid methods for attaining the same end result.

Plasmonic-Grating Sensor

Figure 4:
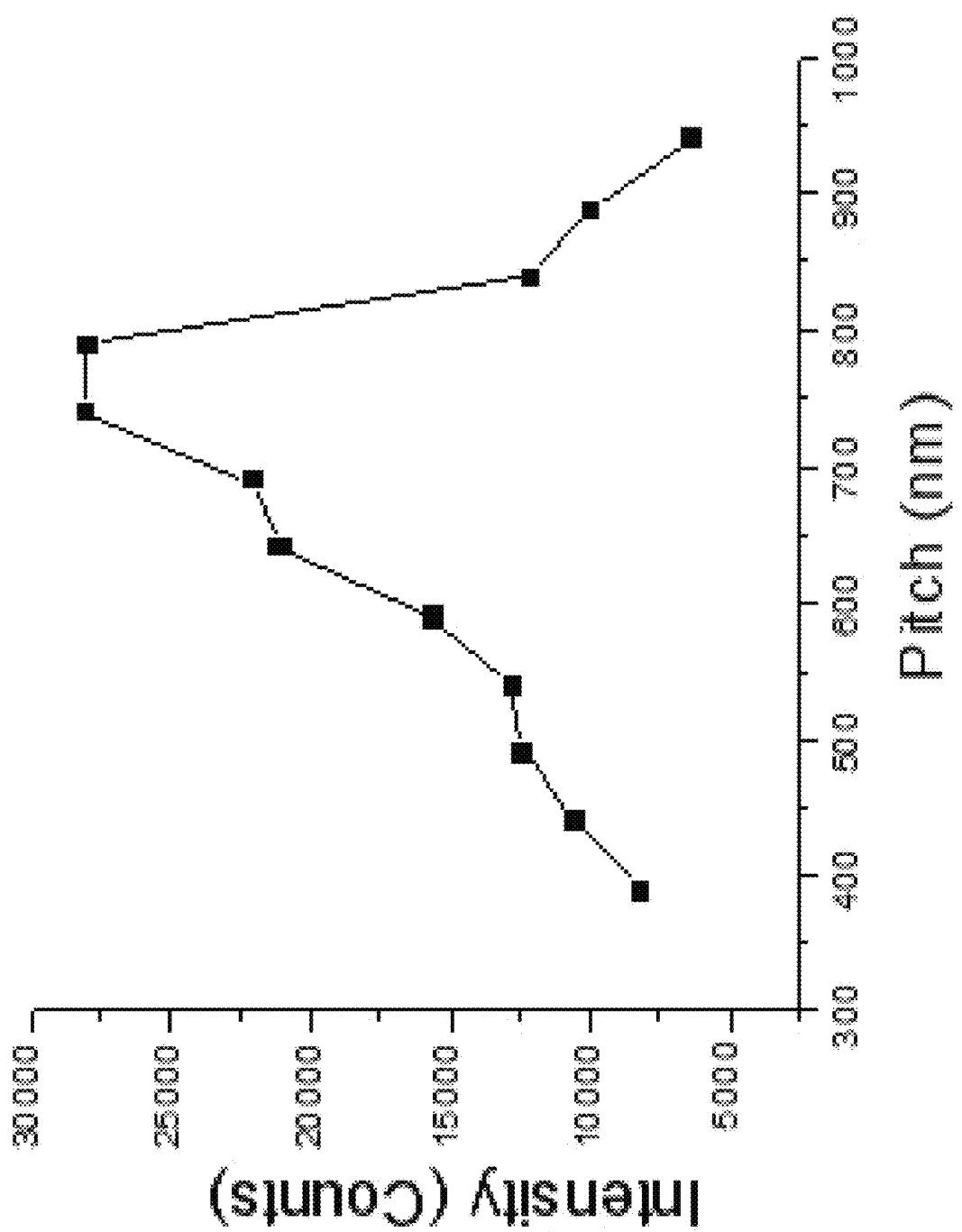
FIG. 4 shows SERS intensity of the 998 $cm^{-1}$ mode (C-H wag) of a self-assembled monolayer of thiophenol on a Au-coated (e-beam evaporation) Si nanopillar array as a function of nanopillar periodicity (pitch).
Figure 5A:
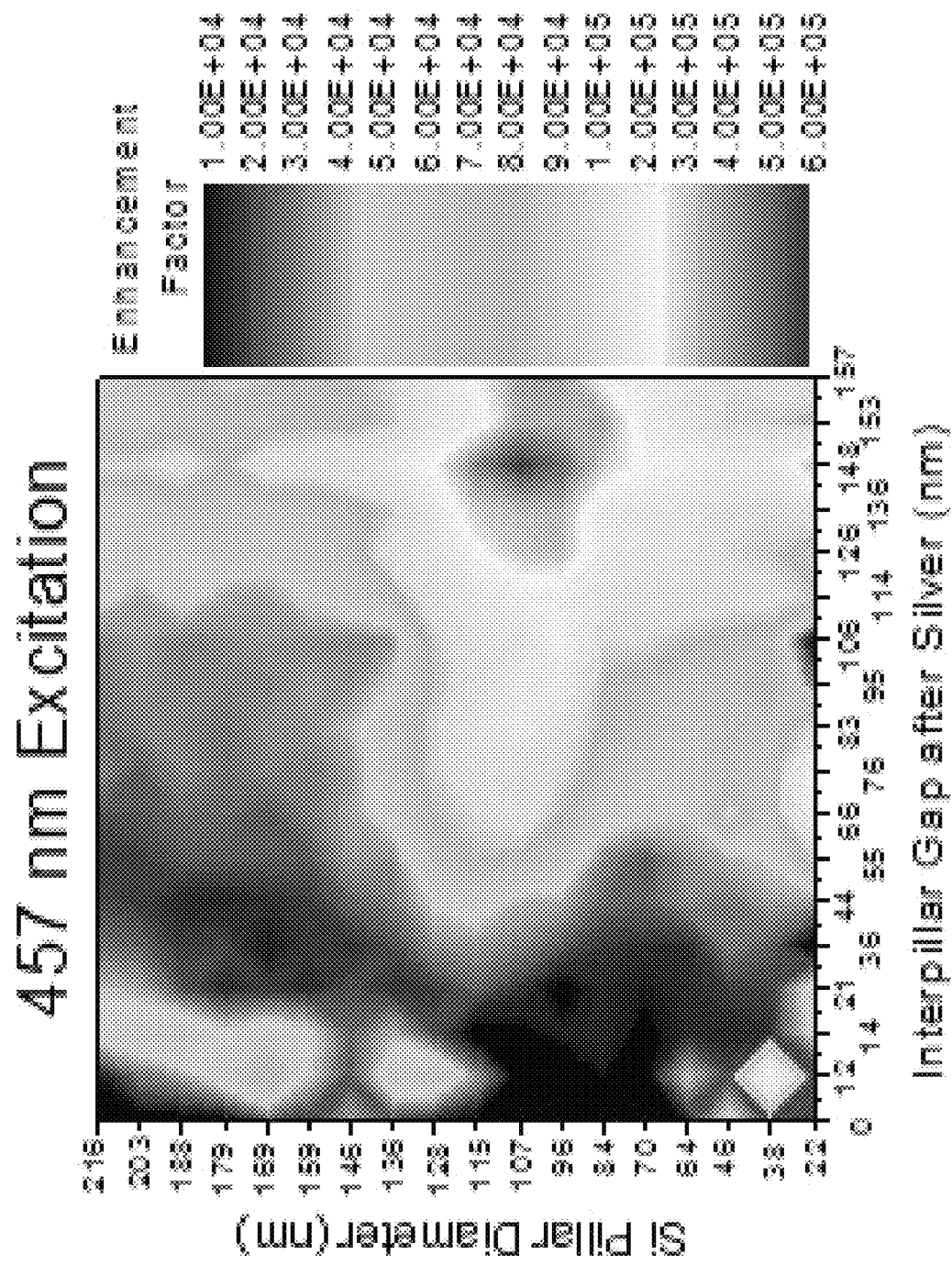
FIGS. 5A-5F present contour plots of the SERS enhancement factor from a series of arrays as a function of interpillar gap (x-axis) and Si nanopillar diameter (y-axis) for a self-assembled monolayer of thiophenol on Ag-coated Si nanopillar arrays detected at 457 (FIG. 5A), 488 (FIG. 5B), 514 (FIG. 5C), 532 (FIG. 5D), 633 (FIG. 5E), and 785 (FIG. 5F) nm incident excitation. The dark regions inside white lines indicate arrays exhibiting high SERS enhancement, and the dark regions not enclosed in white lines correspond to arrays with low enhancement. The line to the right hand side of each plot indicates the optimal diameter for the SERS response.
Figure 5B:
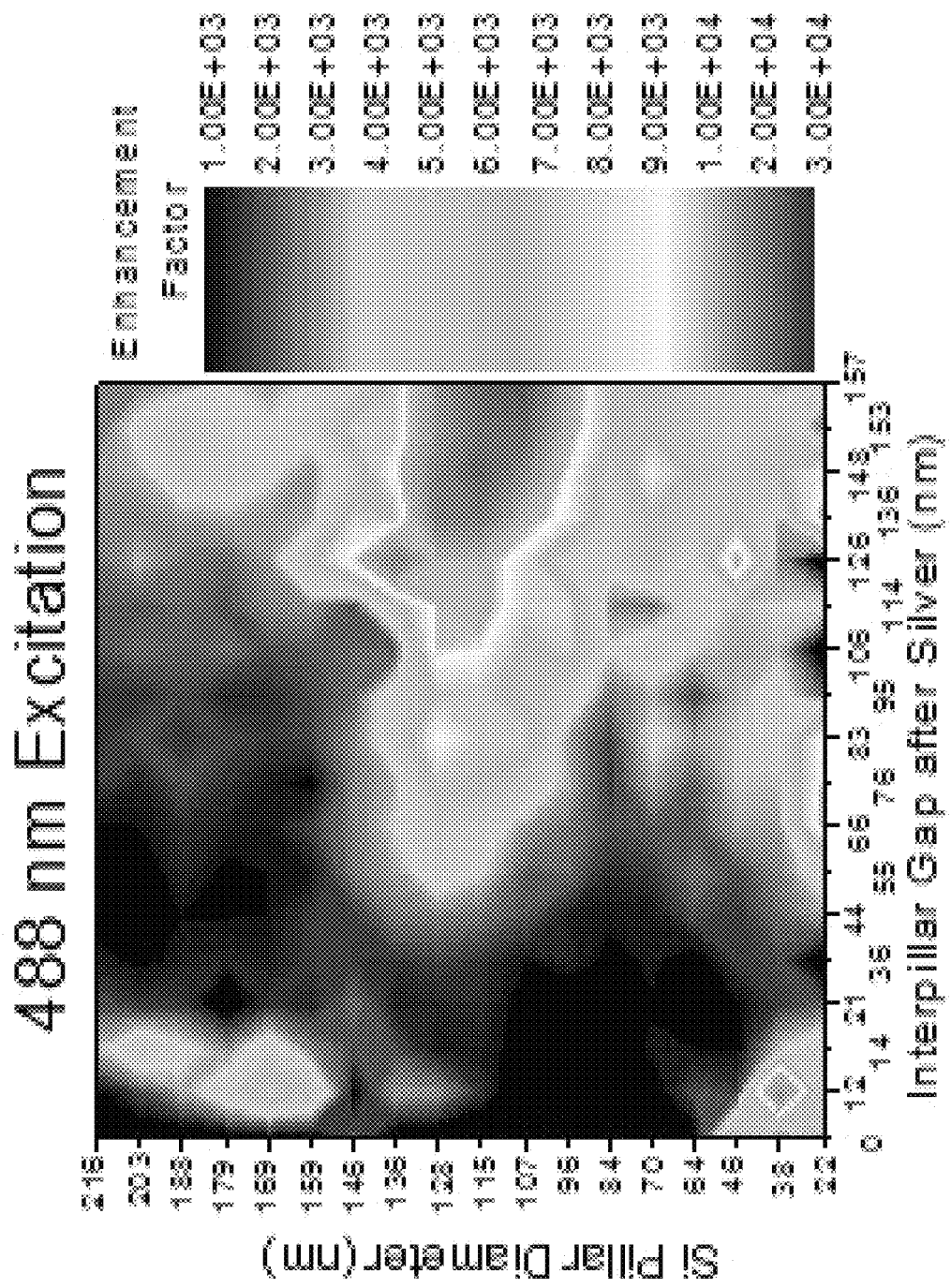
Figure 5C:
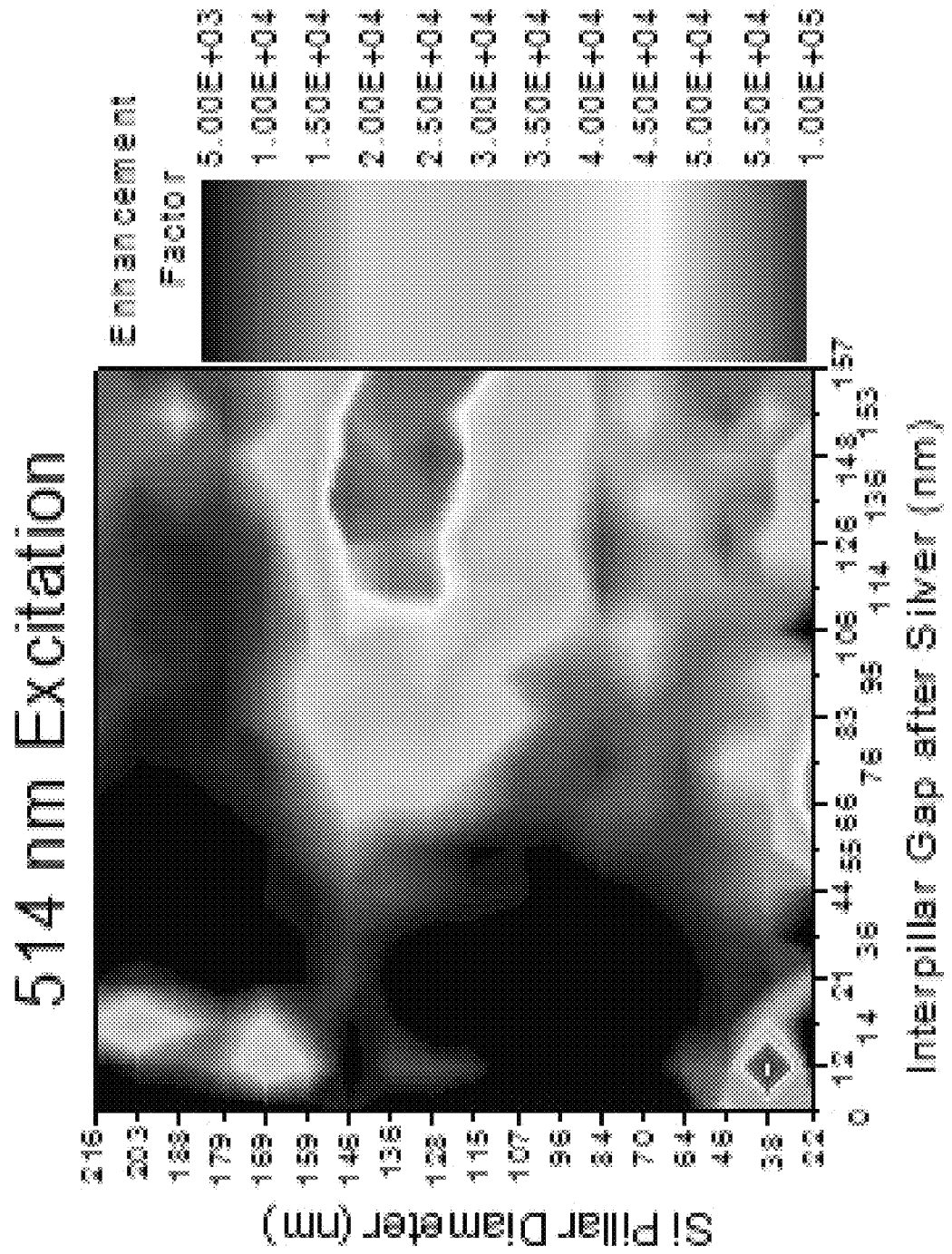
Figure 5D:
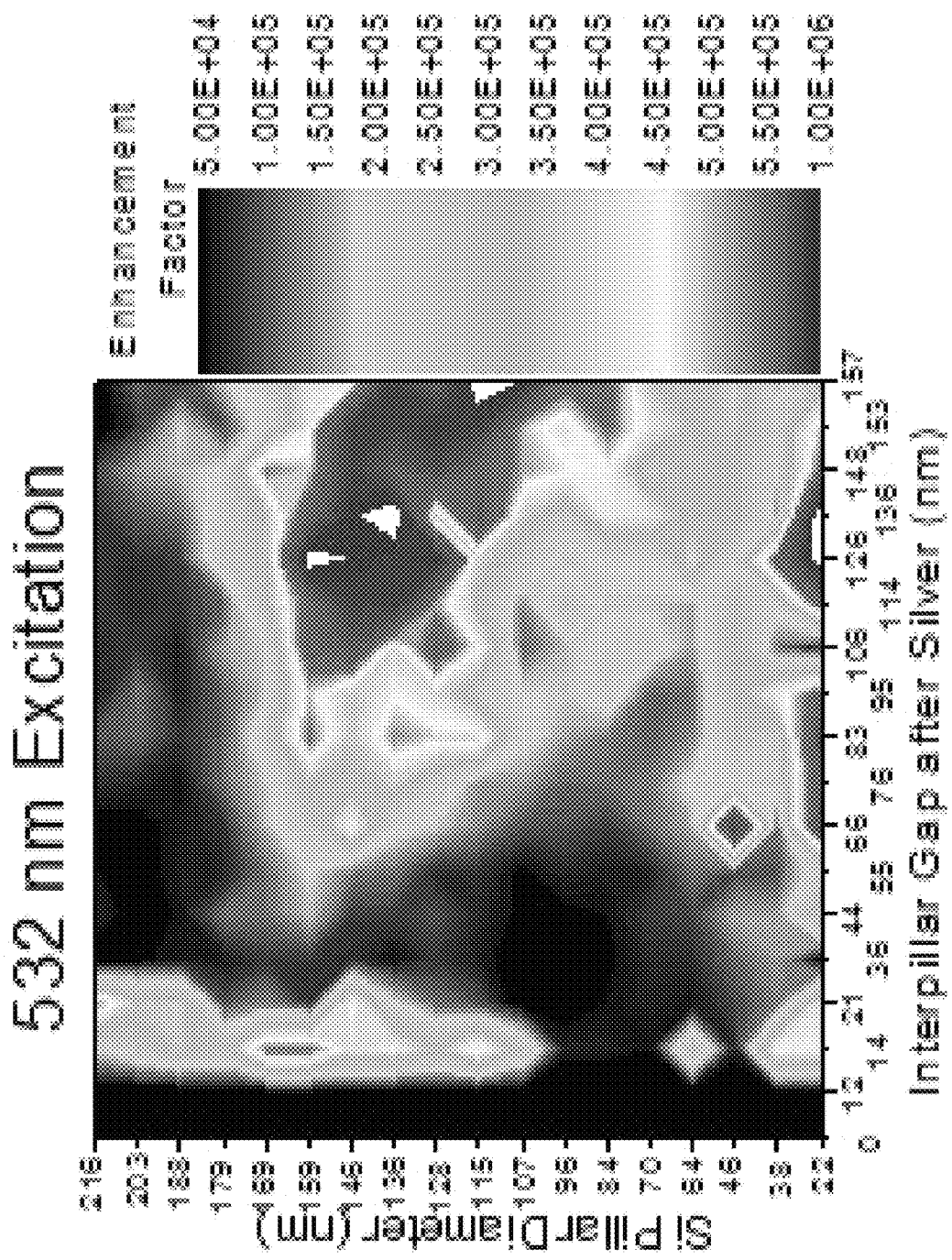
Figure 5E:
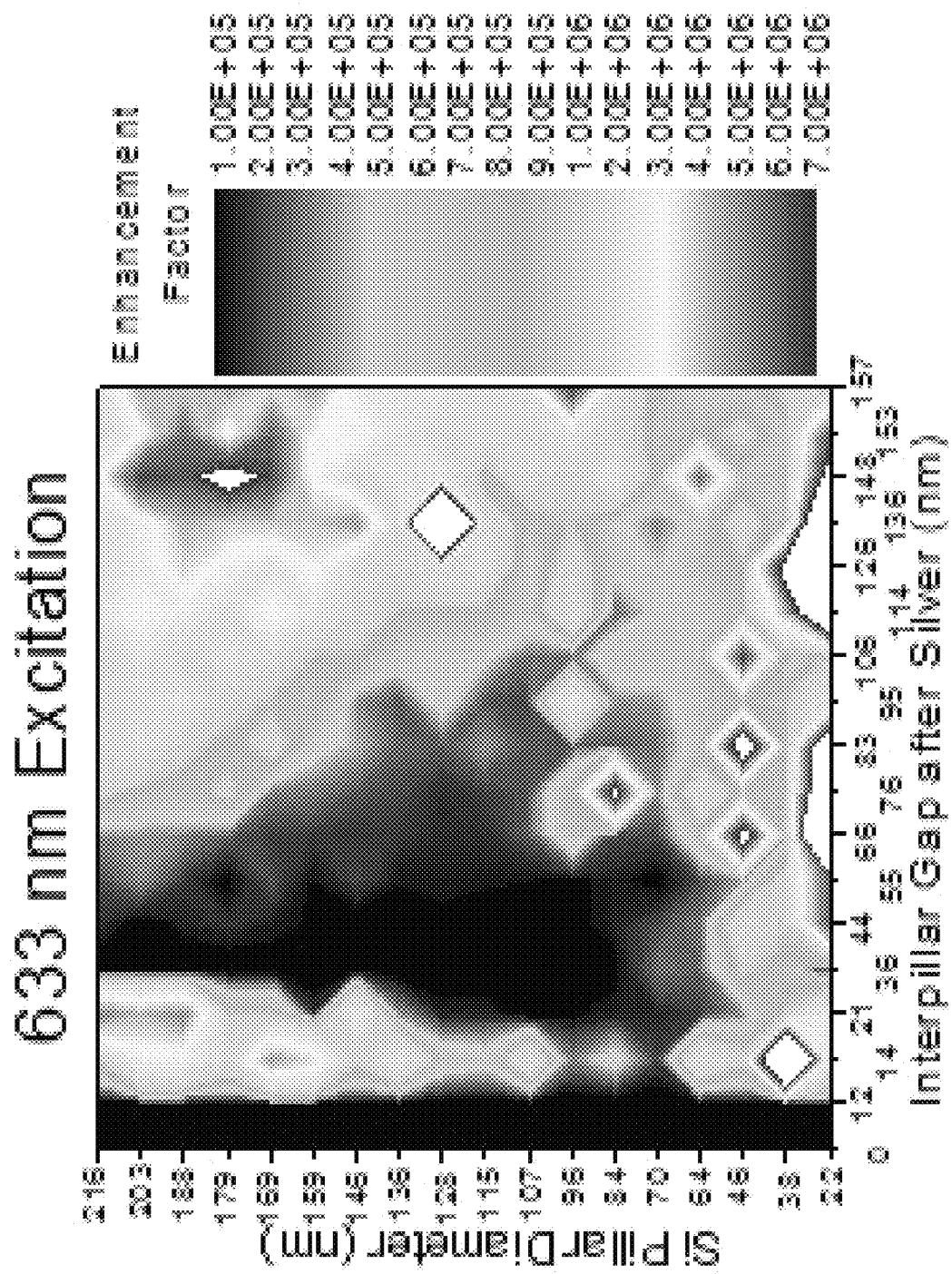
Figure 5F:
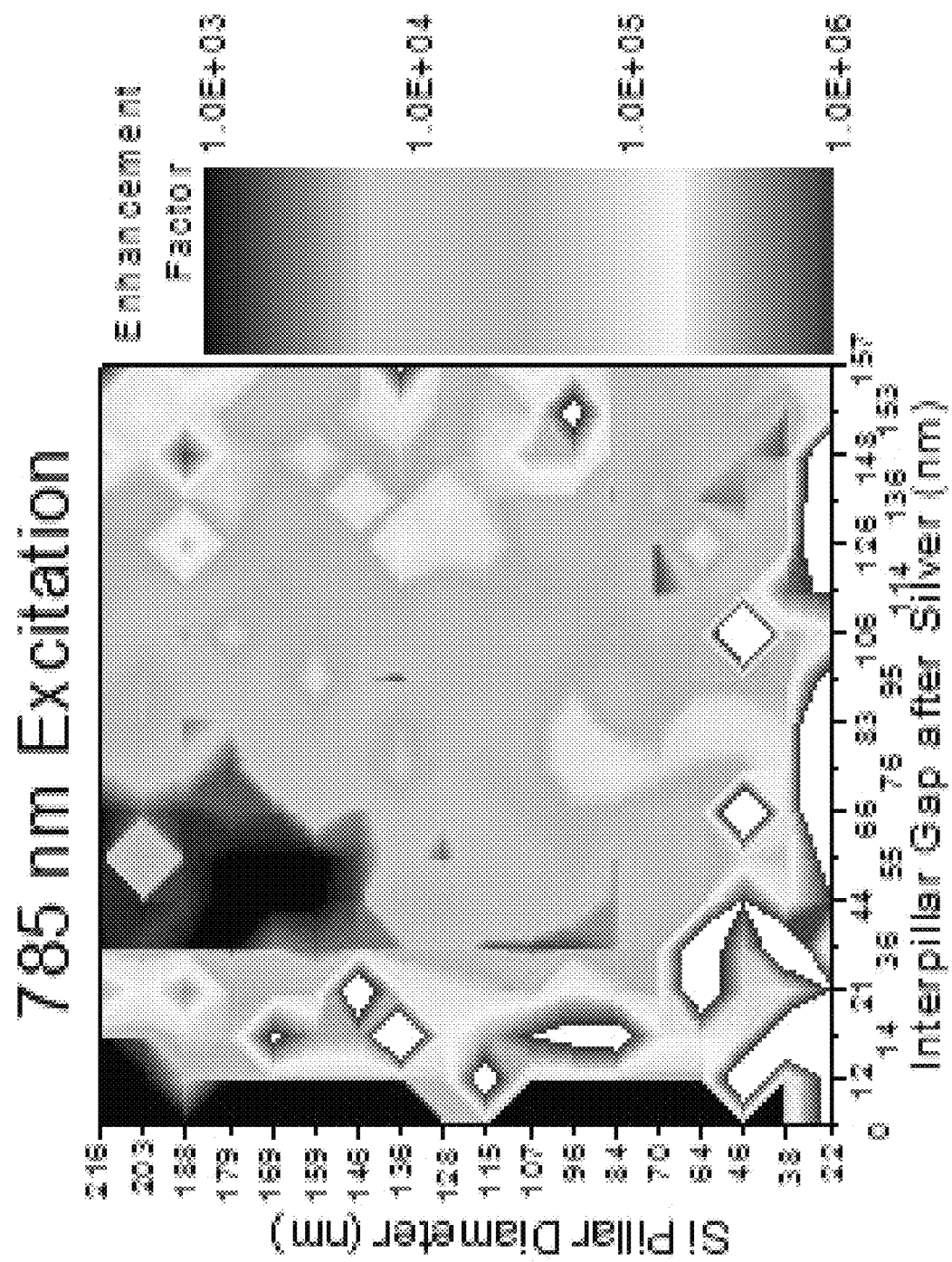

The plasmonic-grating sensor (see FIG. 1A) relies on the plasmonic fields present at each nanoparticle for providing the enhancement of the optical process of interest. The array approach provides a two-fold benefit, with the plasmonic particles providing the enhancement of the optical process of interest and the 2D grating established by the nanoparticle periodicity providing a directionality to the emitted, scattered or transmitted light, effectively taking an optical process that would be emitted into a $4\pi$ solid angle, and instead focusing it into a tight solid angle for increased photon density, and therefore increased signal intensity. It has been shown for one specific geometry consisting of Au-coated Si nanopillars that defining the interparticle pitch to approximately one full wavelength leads to the largest enhancement factors possible for a given architecture at normal incidence. SERS results supporting this are presented in FIG. 4 for Au-coated Si nanopillars with a self-assembled monolayer of benzene thiol at 785 nm incident. Note that the peak SERS response as a function of array periodicity (pitch) is observed at between 750 and 800 nm, which is very close to the incident wavelength. Furthermore, we have shown that the optimal response of the sensor for a given wavelength is dictated primarily by the nanopillar/nanowire diameter or width, as shown in FIGS. 5A-5F, where contour plots of the SERS enhancement factor from each of the 100×100 nanopillar arrays in a given Ag-coated Si-nanopillar array sample are presented as a function of nanopillar diameter and interpillar gap at 457 (FIG. 5A), 488 (FIG. 5B), 514 (FIG. 5C), 532 (FIG. 5D), 633 (FIG. 5E) and 785 (FIG. 5F) nm incident excitation. Note that the optimal response is observed at a small range of diameters and that the peak response shifts to smaller diameters as the incident wavelength is reduced. As shown in the aforementioned figures, the SERS enhancement factors measured from these types of arrays range from the $10^5$-$10^8$ range, depending on the structural parameters and incident wavelength, with an optimal response of $1.1 \times 10^8$.

Coupled-Plasmonic Array Sensor

Figure 6:
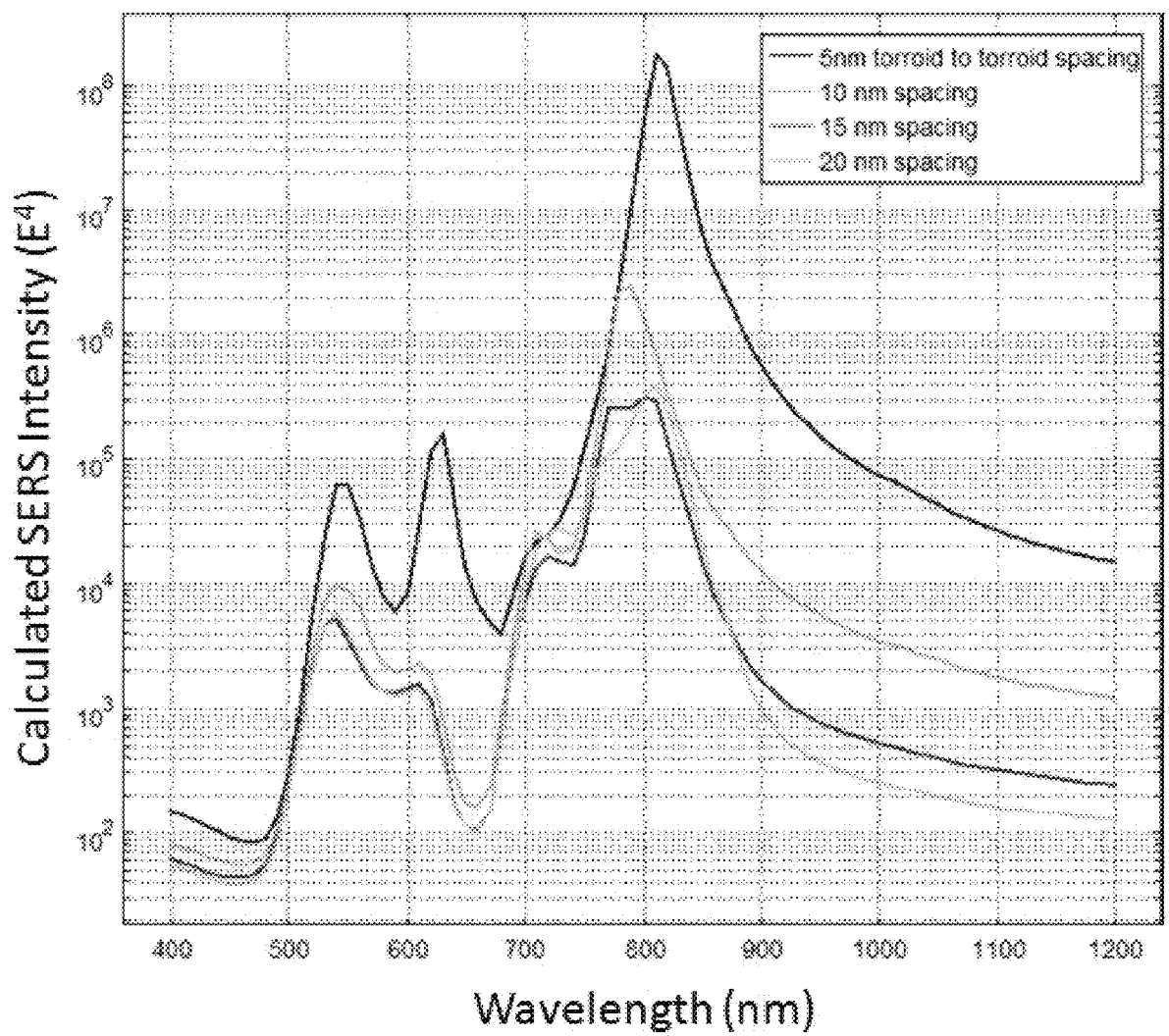
FIG. 6 shows numerical calculations of the expected SERS enhancement as a function of incident wavelength for 150 nm Au-coated Si nanopillars with interpillar gaps of 20, 15, 10, and 5 nm (from bottom to top)

The coupled-plasmonic array sensor (see FIG. 1B) relies upon interparticle plasmonic coupling between adjacent nanopillars/nanowires within the array for providing the enhancement of the optical process of interest. Interparticle plasmonic coupling has two effects; 1) it induces a red-shift in the spectral position of the surface plasmon resonance (SPR), which dictates the wavelength where the optimal performance will be observed and 2) it creates significantly larger plasmonic fields, which in turn lead to dramatic enhancements of the optical process of interest with respect to the isolated plasmonic particles discussed for the plasmonic-grating sensor. Presented in FIG. 6 are SERS enhancement curves calculated using COMSOL Multiphysics 4 for semi-infinite arrays of periodically-spaced, Au-coated Si nanopillars with interparticle separations of 5, 10, and 20 nm. Note that as the particles move closer together that the intensity of the various peaks in the SPR spectra are increased, most notably the most intense mode near 800 nm. There is also the aforementioned red-shift in the peak position, as expected, when the nanopillars are moved closer to one another. With respect to the plasmonic-grating sensor, the coupled-plasmonic array sensor can provide significantly larger enhancements of the optical processes of interest, while enabling some fine control over the spectral position of the SPR peaks and therefore upon the wavelength for the optimal response. This effect was shown recently by the inventors in Si nanopillar arrays overcoated with Ag via the PEALD process, where arrays with separations between particles of approximately 2 nm were found to lead to 1-2 orders of magnitude increase in the SERS enhancement beyond what was observed from widely separated arrays. However, this comes at the cost of losing the ability to redirect the light into a small solid angles that is enabled via the presence of a 2D grating and also involves more complex lithographic and metal deposition efforts. While the nanopillars in these structures are in periodic arrays, the interparticle separation and nanopillar size dictates that the incident light cannot distinguish the particles from each other, and thus the array is 'seen' as an effective medium. From such structures enhancement factors $>10^8$ have been observed at various wavelengths.

3) Plasmo-Photonic Array Sensor

Figures 1A, 1B, 1C:
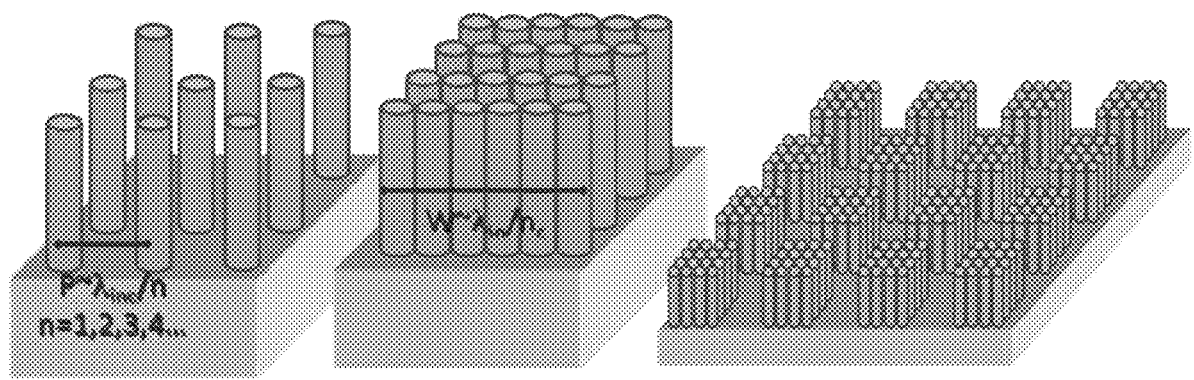
FIGS. 1A-1C are schematic representations of three embodiments of the present invention: plasmonic 2D grating arrays (FIG. 1A), plasmonically-coupled arrays (FIG. 1B), and plasmo-photonic arrays (FIG. 1C).

A method for attaining the optimal plasmonic enhancement, while still providing the 2D grating structure needed to redirect the emitted/scattered light into a small solid angle can be attained via the plasmo-photonic approach presented in FIG. 1C. In this case, the subarrays would feature either periodically- or randomly-spaced nanoparticles with interparticle separations of <20 nm. This provides the means for enhancing the optical process of interest (e.g. SERS, SEFS, etc. In order to attain the desired directionality of the emitted/scattered light, these subarrays are periodically spaced in one or two dimensions to create a diffraction grating of plasmonically-coupled nanoparticles. By varying the periodicity (pitch) of the subarrays, one can control the angle at which the enhanced light will be emitted/scattered. By controlling the nanoparticle structure (nanowire/nanopillar type, diameter, height; metal type and thickness; etc.) one can control the overall enhancement and the spectral position of the optimal response. This effectively requires a double-resonant structure where the wavelength for the desired diffraction response and the optimal plasmonic enhancement coincide.

In addition to the simple arrays that utilize identical nanowires as components, we can also envision several different scenarios that would change the type of periodicity and the type of unit cell. A more compact geometry would entail for example a hexagonal structure with close packing where neighboring rows are displaced from each other by half the period. This would produce a structure that has a higher density of nanostructures.

In addition to changing the symmetry of the array it is possible to modify a nanostructure array and repeat that modification in a periodic fashion. The effects of removing a nanowire from a subarray is shown in FIGS. 7A and 7B, where COMSOL simulations of two arrays of solid silver nanowires where no nanowires are missing (FIG. 7A) and the central nanowire has been removed (FIG. 7B). By simply removing a single nanowire, the electric fields around the remaining wires are thus modified. The fields around the wires directly above and below the missing structure have new orthogonal fields that are increased in intensity in the direction of the incident light polarization. In fact, as FIG. 7B indicates, the plasmonic fields are actually increased by a factor of two in comparison to the fields present within the perfect array [FIG. 7A]. This approach can be expanded by also changing the relative size, shape or material of a given nanostructure within the otherwise unchanged array or subarray in any of the three sensor structures presented.

The plasmonic grating, plasmonically-coupled and plasmo-photonic sensor arrays described above can be realized with a variety of different components. As noted above, the nanowires can be formed from pure metals that exhibit plasmonic effects such as Au, Ag, Cu or Al or from dielectric/semiconductor core-shell structures that are coated with a thin plasmonically-active metal shell. The dielectric cores can be Si, $SiO_2$, ZnO, $Ga_2O_3$, GaN, SiC or virtually any other dielectric or semiconducting material that can be fabricated or grown into such closely-spaced, periodic arrays. The nanostructures can be created via standard nanostructure growth techniques or via wet-chemical or dry etching of an initial prepatterned substrate. In all of these cases, the metal can be deposited via standard or exotic metal deposition techniques such as e-beam evaporation, sputtering, atomic layer deposition, electro- or electroless deposition, chemical vapor deposition, etc.

Between the various fabrication techniques (nanowire growth and nanopillar fabrication), the substrates on which these arrays are fabricated are not limited except by fabrication restrictions. Transparent substrates are appropriate for circumstances in which illumination from below or through sample detection is required, while a highly reflecting substrate (Si or double-bragg reflector) would be more appropriate to situations that require attaining a reflected return signal such as in standoff sensing or tagging, tracking and locating schemes.

In addition to sensor arrays, such a method could be used to provide enhancements and directionality to emitters such as light-emitting or laser diodes, where either the core of the nanostructure itself or the underlying substrate is used as the source of the emission and the array is designed such that the plasmon resonance of the subarrays will enhance either the absorption of an incident exciting light source or the photoluminescence emission process. For example, in the latter case, one could envision an array of ZnO nanowire emitters coated with silver. Such nanowires have both an ultraviolet bandedge emission and a blue defect band emission. If a blue emitter was desired, one could design the SPR of the subarrays to be peaked at a wavelength within the bandedge emission, thus enabling the initial excitation of both sources via electrical processes, while subsequently reabsorbing a significant portion of the bandedge emission. This reabsorbed energy would then induce further defect band emission, enhancing the output. In addition, such a process could also be created via a double or multiple quantum well or quantum dot structures with two distinct band gaps (i.e. absorption/emission characteristics) with the plasmonic array tuned to enhance the absorption of the wider gap structure that would emit and in turn optically pump the lower gap system, thereby leading again to enhanced emission. One could also envision tailoring the plasmon resonance to be located at a desired wavelength within the bandwidth of the defect band emission, simultaneously increasing the emission intensity via the surface-enhanced fluorescence process and also narrowing the bandwidth of the emission due to the relatively narrow SPR with respect to the emission line. It is possible to use two arrays in concert for sensing applications, one at the sensor side used to enhance the intensity of the emitted or scattered light and another on the detecting side to enhance the collection of this irradiated signal. The matched sensing elements would increase the collection efficiency by using the arrays to match the spectral and angular characteristic of the return signal. The additional enhancement on the sensing end would aid in the signal to noise of the detection system.

Finally, one can envision a wide array of applications in metamaterials, with similar structures serving as methods for attaining very small focused spots of emitted light in the near field (superlensing effects) or cloaking for example.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," are not to be construed as limiting the element to the singular.

What is claimed as new and desired to be protected by Letters Patent of the United States is:

1. A plasmonic grating sensor, comprising vertically aligned periodic arrays of plasmonic nanopillars, plasmonic nanowires, or both, wherein there is an interparticle pitch of 2000 nm, and wherein a periodicity of the vertically aligned periodic arrays establishes a 2D grating.

2. The plasmonic grating sensor of claim 1, wherein the nanopillars, nanowires, or both comprise silver, gold, aluminum, copper, or other metal used for its plasmonic properties or any combination thereof.

3. The plasmonic grating sensor of claim 1, wherein the nanopillars, nanowires, or both comprise a core-shell nanostructure where a semiconductor or dielectric nanowire or nanopillar is coated with a metal film.

* * * * *